US012696119B2

(12) United States Patent
Chen et al.

(10) Patent No.: US 12,696,119 B2
(45) Date of Patent: Jul. 28, 2026

(54) METHOD AND APPARATUS FOR CALCULATING SIGNAL QUALITY VALUE ACCORDING TO REFERENCE SIGNAL AND SIGNAL UNDER TEST THAT IS DERIVED FROM PREDETERMINED SIGNAL PROCESSING OF REFERENCE SIGNAL

(71) Applicant: Airoha Technology Corp., Hsinchu City (TW)

(72) Inventors: Jeng-Hong Chen, Manhattan Beach, CA (US); Yun-Xuan Zhang, Taipei City (TW)

(73) Assignee: Airoha Technology Corp., Hsinchu City (TW)

( * ) Notice: Subject to any disclaimer, the term of this patent is extended or adjusted under 35 U.S.C. 154(b) by 295 days.

(21) Appl. No.: 18/403,701

(22) Filed: Jan. 3, 2024

(65) Prior Publication Data

US 2025/0220476 A1     Jul. 3, 2025

(51) Int. Cl.
| | |
|---|---|
| *H04W 24/10* | (2009.01) |
| *H04B 17/309* | (2015.01) |
| *H04L 5/00* | (2006.01) |
| *H04L 27/20* | (2006.01) |

(52) U.S. Cl.
CPC .......... *H04W 24/10* (2013.01); *H04B 17/309* (2015.01); *H04L 5/0051* (2013.01); *H04L 27/2017* (2013.01)

(58) Field of Classification Search
None
See application file for complete search history.

(56) References Cited

U.S. PATENT DOCUMENTS

| | | | |
|---|---|---|---|
| 2021/0344579 A1* | 11/2021 | Hirschmann | .......... H04B 17/15 |
| 2024/0027524 A1* | 1/2024 | Petzsch | .............. G01R 31/2889 |
| 2025/0067782 A1* | 2/2025 | Mohindra | .............. G01R 29/06 |

FOREIGN PATENT DOCUMENTS

| | | |
|---|---|---|
| CN | 104380631 B | 11/2016 |
| CN | 110912847 A | 3/2020 |

* cited by examiner

*Primary Examiner* — Hong S Cho
(74) *Attorney, Agent, or Firm* — Winston Hsu

(57) ABSTRACT

A signal quality measurement apparatus includes a processing circuit and a signal quality measurement circuit. The processing circuit receives a reference signal from a first circuit and a signal under test from a second circuit, and refers to the reference signal to derive a signal after processing from the signal under test, wherein the signal under test is derived from predetermined signal processing of the reference signal. The signal quality measurement circuit calculates a signal quality value according to the reference signal and the signal after processing.

18 Claims, 5 Drawing Sheets

METHOD AND APPARATUS FOR CALCULATING SIGNAL QUALITY VALUE ACCORDING TO REFERENCE SIGNAL AND SIGNAL UNDER TEST THAT IS DERIVED FROM PREDETERMINED SIGNAL PROCESSING OF REFERENCE SIGNAL

BACKGROUND OF THE INVENTION

1. Field of the Invention

The present invention relates to wireless communications, and more particularly, to a method and apparatus for calculating a signal quality value according to a reference signal (e.g., a baseband modulation signal) and a signal under test that is derived from predetermined signal processing (e.g., frontend signal processing) of the reference signal.

2. Description of the Prior Art

Due to its supreme low-power and low-complexity in implementations, the Gaussian frequency shift keying (GFSK) modulated signal has been adopted in various wireless communication systems, such as Bluetooth (BT) systems. With the advance of the wireless communication technology, more and more advanced GESK modulators have been implemented. For example, an advanced GFSK modulator may direct employ polar-modulation, all digital phase-locked loop (ADPLL), one-point polar-modulation, or two-point polar-modulation. However, the common tool to verify the modulation accuracy or signal quality of a GFSK modulated signal is checking the frequency deviation (FD) from the opening of an eye pattern (also known as an eye diagram) shown on an oscilloscope display, or comparing average FD values that are obtained when the input bits are '11110000' and '10101010' respectively. Thus, there is a need for an innovative signal quality measurement design which is capable of calculating a signal quality value to quantify signal quality or modulation accuracy of an output signal of a device under test (DUT) in a wireless communication device (e.g., a BT device or a ZigBee device), without using any test instrument.

SUMMARY OF THE INVENTION

One of the objectives of the claimed invention is to provide a method and apparatus for calculating a signal quality value according to a reference signal (e.g., a baseband modulation signal) and a signal under test that is derived from predetermined signal processing (e.g., frontend signal processing) of the reference signal.

According to a first aspect of the present invention, an exemplary signal quality measurement apparatus is disclosed. The exemplary signal quality measurement apparatus includes a processing circuit and a signal quality measurement circuit. The processing circuit is arranged to receive a reference signal from a first circuit and a signal under test from a second circuit, and refer to the reference signal to derive a signal after processing from the signal under test, wherein the signal under test is derived from predetermined signal processing of the reference signal. The signal quality measurement circuit is arranged to calculate a signal quality value according to the reference signal and the signal after processing.

According to a second aspect of the present invention, an exemplary signal quality measurement method is disclosed. The exemplary signal quality measurement method includes: receiving a reference signal from a first circuit and a signal under test from a second circuit, wherein the signal under test is derived from predetermined signal processing of the reference signal; referring to the reference signal to derive a signal after processing from the signal under test; and calculating a signal quality value according to the reference signal and the signal after processing.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the following description and claims, which refer to particular components. As one skilled in the art will appreciate, electronic equipment manufacturers may refer to a component by different names. This document does not intend to distinguish between components that differ in name but not in function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

Figure 1:
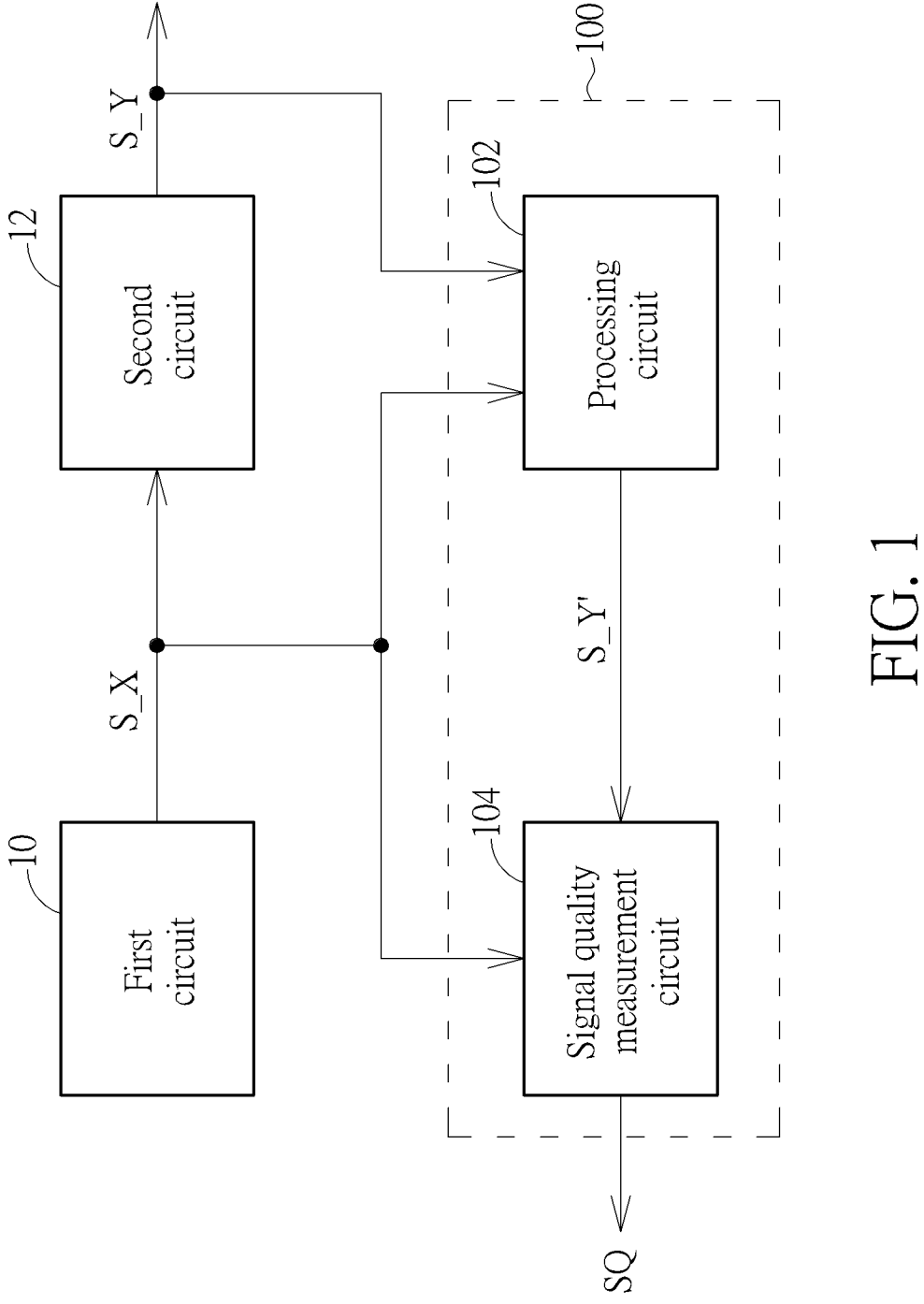
FIG. 1 is a diagram illustrating a signal quality measurement apparatus according to an embodiment of the present invention.

FIG. 1 is a diagram illustrating a signal quality measurement apparatus according to an embodiment of the present invention. The signal quality measurement apparatus 100 includes a processing circuit 102 and a signal quality measurement circuit 104. The processing circuit 102 is arranged to receive a reference signal S_X from a first circuit 10 and a signal under test S_Y from a second circuit 12, and refer to the reference signal S_X to derive a signal after processing S_Y' from the signal under test S_Y. For example, the second circuit 12 is a DUT in a wireless communication device. Hence, the signal under test S_Y is derived from predetermined signal processing (e.g., frontend signal processing) of the reference signal S_X. That is, the reference signal S_X is not processed/destroyed by the predetermined signal processing yet, and may be treated as an ideal signal for an output of the second circuit 12. For example, the reference signal S_X may be a modulation result of a known random sequence of 0's and 1's. That is, the reference signal S_X may be a baseband modulation signal output from a modulator which is a part of a modulator/demodulator (modem) module included in the wireless communication device. The signal quality measurement circuit 104 is arranged to calculate a signal quality value SQ according to the reference signal S_X and the signal after processing S_Y'.

Figure 2:
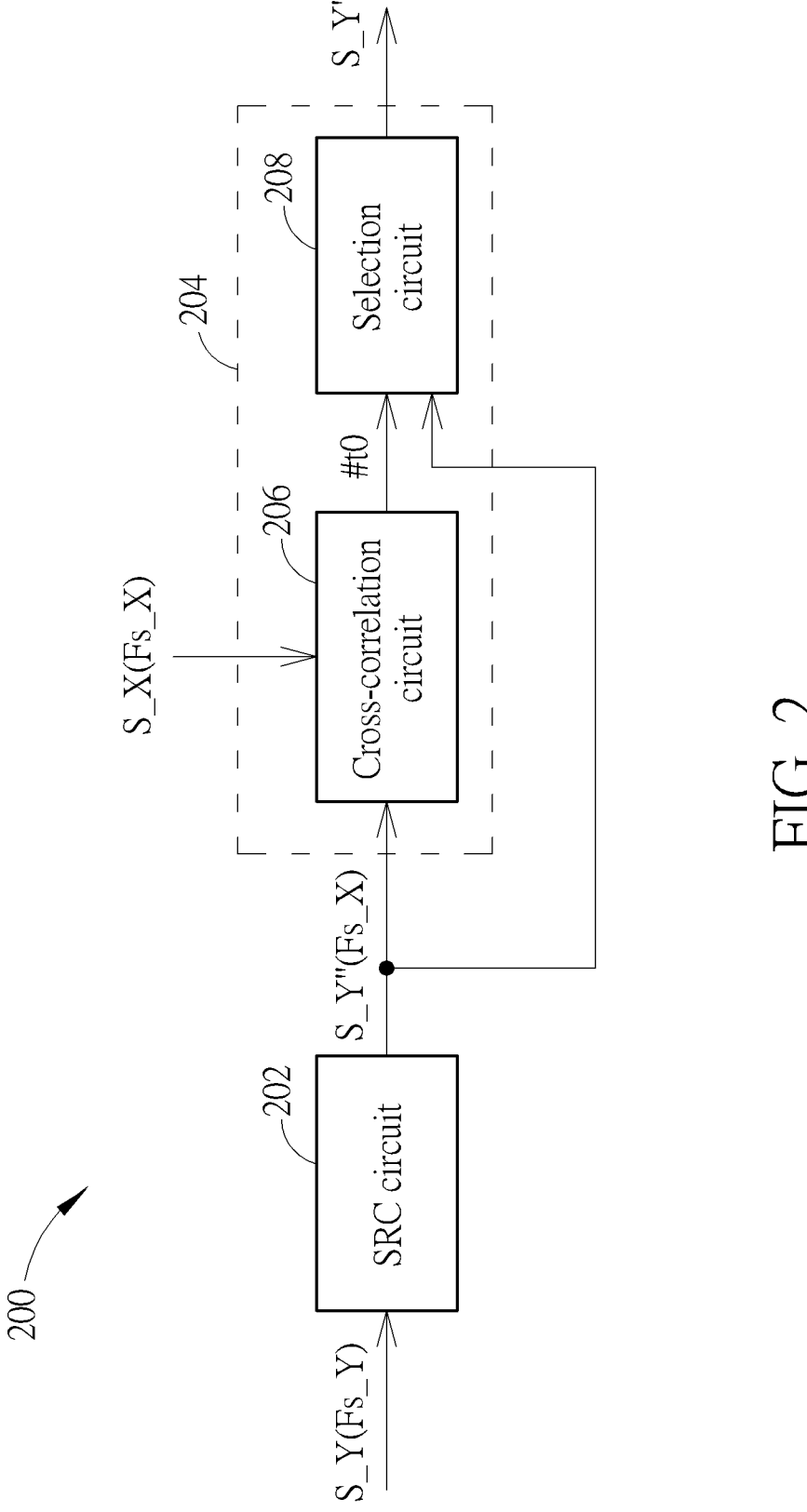
FIG. 2 is a diagram illustrating a processing circuit according to an embodiment of the present invention.

FIG. 2 is a diagram illustrating a processing circuit according to an embodiment of the present invention. The processing circuit 102 shown in FIG. 1 may be implemented using the processing circuit 200 shown in FIG. 2. In this embodiment, the processing circuit 200 includes a sampling rate conversion (SRC) circuit 202 and a follow-up processing circuit 204. The follow-up processing circuit 204 may include a cross-correlation circuit 206 and a selection circuit 208. The first circuit 10 may generate the reference signal S_X (which is a digital signal) at a sampling rate Fs_X. The second circuit 12 may generate the signal under test S_Y (which is a digital signal) at a different sampling rate Fs_Y (i.e., Fs_Y≠Fs_X). Hence, the reference signal S_X may include a sample sequence consisting of a plurality of samples $x_n$ {$x_n$, n=0, 1, ..., N−1} output at the sampling rate Fs_X, and the signal under test S_Y may include a sample sequence consisting of a plurality of samples $y_m$ {$y_m$, m=0, 1, ..., M−1} output at the sampling rate Fs_Y. The SRC circuit 202 is arranged to perform an SRC operation upon the signal under test S_Y (particularly, samples $y_m$ of signal under test S_Y) to generate a re-sampled signal under test S_Y". The SRC circuit 202 may generate the re-sampled signal under test S_Y" at the sampling rate Fs_X, such that the re-sampled signal under test S_Y" and the reference signal S_X have the same sampling rate. Hence, the re-sampled signal under test S_Y" may include a sample sequence consisting of a plurality of samples y"k {y"k, k=0, 1, ..., K−1} output at the sampling rate Fs_X.

The sampling rate Fs_Y is different from (e.g., higher than or lower than) the sampling rate Fs_X. In a case where the sampling rate Fs_Y is higher than the sampling rate Fs_X, the SRC circuit 202 is configured to act as a down-sampler for performing down-sampling. In another case where the sampling rate Fs_Y is lower than the sampling rate Fs_X, the SRC circuit 202 is configured to act as an up-sampler for performing up-sampling. In other words, the SRC circuit 202 may be a down-sampler or an up-sampler, depending upon the relationship between the sampling rates Fs_X and Fs_Y. For simplicity, the following assumes that the sampling rate Fs_Y is higher than the sampling rate Fs_X. Hence, the SRC operation performed by the SRC circuit 202 includes down-sampling applied to the signal under test S_Y. Specifically, the reference signal S_X may include samples $x_n$ {$x_n$, n=0, 1, ..., N−1} output at the sampling rate Fs_X during a period T_X, the signal under test S_Y may include samples $y_m$ {$y_m$, m=0, 1, ..., M−1} output at the sampling rate Fs_Y during a period T_Y, and the re-sampled signal under test S_Y" may include samples y"$_k$ {y"$_k$, k=0, 1, ..., K−1} output at the sampling rate Fs_X during the period T_Y, where T_Y>T_X, M>N, and K>N. In addition, a starting time of the period T_Y is earlier than a starting time of the period T_X, and an ending time of the period T_Y is later than an ending time of the period T_X.

After the re-sampled signal under test (e.g., down-sampled signal under test) S_Y" is available, the follow-up processing circuit 204 is arranged to derive the signal after processing S_Y' from the re-sampled signal under test S_Y" according to the reference signal S_X. Since the reference signal S_X and the signal under test S_Y are generated from different circuits 10 and 12, the cross-correlation circuit 206 is arranged to perform cross-correlation between the re-sampled signal under test S_Y" and the reference signal S_X, to find an optimal starting sample position #t0 of the re-sampled signal under test S_Y" (i.e., a sample position of the first sample in a sample sequence consisting of N consecutive samples selected from K samples y"$_k$ {y"$_k$, k=0, 1, ..., K−1} that best matches the sample sequence of N samples $x_n$ {$x_n$, n=0, 1, ..., N−1}). That is, the cross-correlation circuit 206 is to find a subset of the re-sampled signal under test S_Y" (which includes a sequence of samples y"$_k$ {y"$_k$, k=0, 1, ..., K−1} at the sampling rate Fs_X) that has consecutive samples from #t0 to #t0+N−1 and has the maximum correlation with the reference signal S_X (which includes a sequence of samples $x_n$ {$x_n$, n=0, 1, ..., N−1} at the sampling rate Fs_X).

After the optimal starting sample position #t0 is found by the cross-correlation circuit 206, the selection circuit 208 is arranged to extract consecutive N samples from the samples y"$_k$ {y"$_k$, k=0, 1, ..., K−1} and output the consecutive N samples (i.e., a subset of the re-sampled signal under test S_Y") as the signal after processing S_Y', where the consecutive N samples start from a sample y"$_{#t0}$ corresponding to the optimal starting sample position #t0. Specifically, a subset of the SRC output (i.e., re-sampled signal under test S_Y") that has consecutive samples y"$_{#t0}$-y"$_{#t0+N−1}$ from #t0 to #t0+N−1 is extracted and output as the signal after processing S_Y'. Hence, the signal after processing S_Y' includes a sample sequence consisting of samples y'$_n$ {y'$_n$, n=0, 1, ..., N−1} being a subset {y"$_k$, k=#t0, ..., #t0+N−1} of samples y"$_k$ {y"$_k$, k=0, 1, ..., K−1} included in the re-sampled signal under test S_Y" output from the SRC circuit 202.

Figure 3:
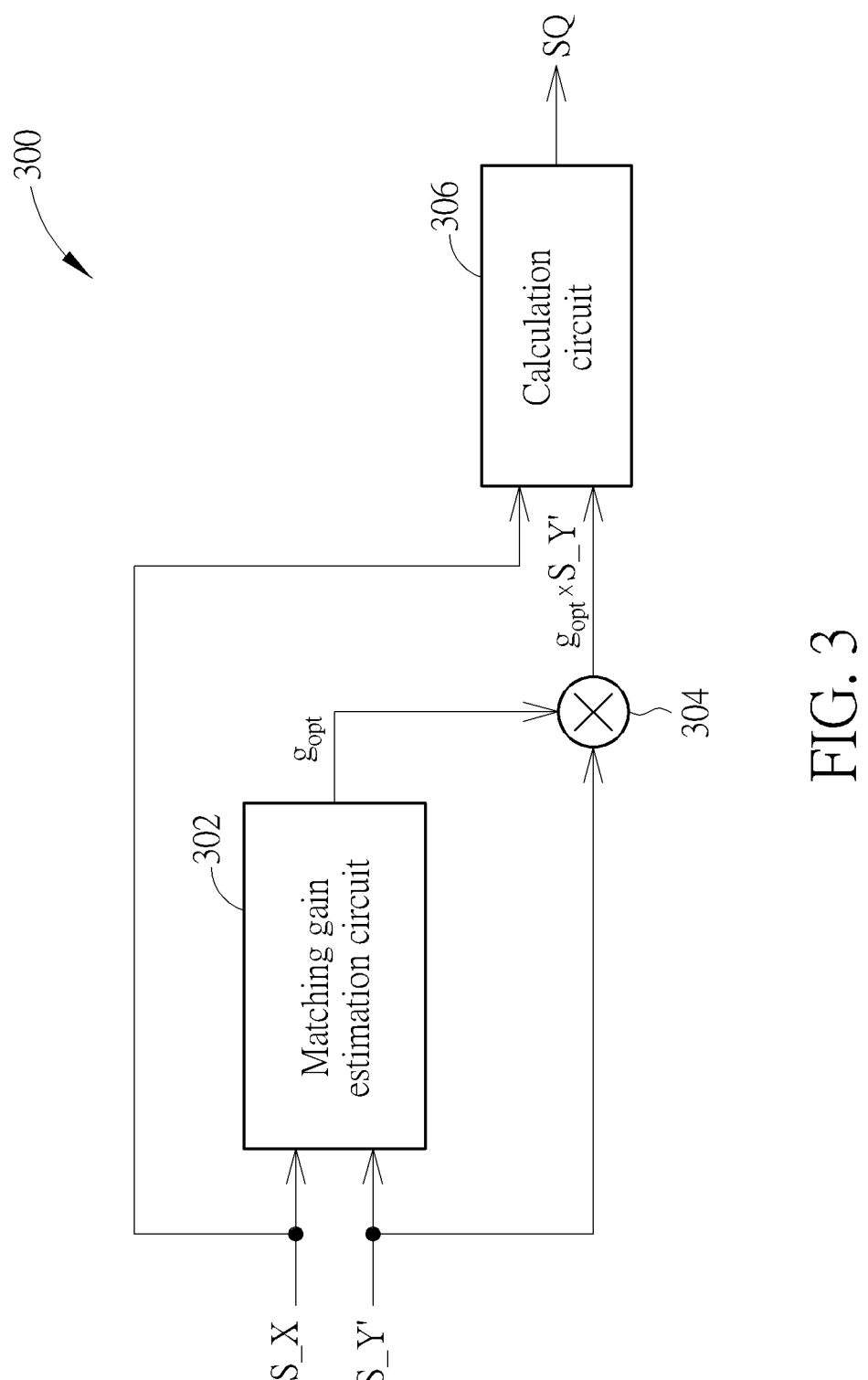
FIG. 3 is a diagram illustrating a signal quality measurement circuit according to an embodiment of the present invention.

FIG. 3 is a diagram illustrating a signal quality measurement circuit according to an embodiment of the present invention. The signal quality measurement circuit 104 shown in FIG. 1 may be implemented using the signal quality measurement circuit 300 shown in FIG. 3. In this embodiment, the signal quality measurement circuit 300 includes a matching gain estimation circuit 302, an adjustment circuit 304, and a calculation circuit 306. The matching gain estimation circuit 302 is arranged to find an optimal matching gain $g_{opt}$ for the signal after processing S_Y' according to the reference signal S_X (particularly, samples $x_n$ {$x_n$, n=0, 1, ..., N−1} of reference signal S_X) and the signal after processing S_Y' (particularly, samples y'$_n$ {Y' n, n=0, 1, ..., N−1} of signal after processing S_Y'). In this embodiment, the matching gain estimation circuit 302 is used to find the optimal matching gain $g_{opt}$ that minimizes |S_X−$g_{opt}$·S_Y|'. For example, the optimal matching gain $g_{opt}$ may be computed using the following formula.

$$g_{opt} = \text{Min}_g \left\{ \sum_{n=0}^{N-1} |x_n - g \cdot y'_n|^2 \right\} \qquad (1)$$

The adjustment circuit 304 may be implemented by a multiplier, and is arranged to apply the optimal matching gain $g_{opt}$ to the signal after processing S_Y' (particularly, samples y'$_n$ {y'$_n$, n=0, 1, ..., N−1} of signal after processing S_Y'), to generate an adjusted signal after processing $g_{opt}$·S_Y' that includes a sample sequence consisting of a plurality of gain-adjusted samples $g_{opt}$y'$_n$, respectively.

The calculation circuit 306 is arranged to calculate the signal quality value SQ according to the reference signal S_X (particularly, samples $x_n$ of reference signal S_X) and the adjusted signal processing $g_{opt}$·S_Y' (particularly, gain-adjusted samples $g_{opt}$y'$_n$ of adjusted signal after processing $g_{opt} \cdot S\_Y'$). For example, the signal quality value SQ may be computed using the following formula.

$$SQ = \sqrt{\frac{\sum_{n=0}^{N-1} |x_n - g_{opt} \cdot y_n'|^2}{\sum_{n=0}^{N-1} |x_n|^2}} \qquad (2)$$

The proposed signal quality measurement scheme can be employed to quantity signal quality of a constant envelope (CE) modulation signal. Alternatively, the proposed signal quality measurement scheme may be employed to quantity signal quality of a non-CE modulated signal. To put it simply, any wireless communication device using the proposed signal quality measurement scheme falls within the scope of the present invention.

Figure 4:
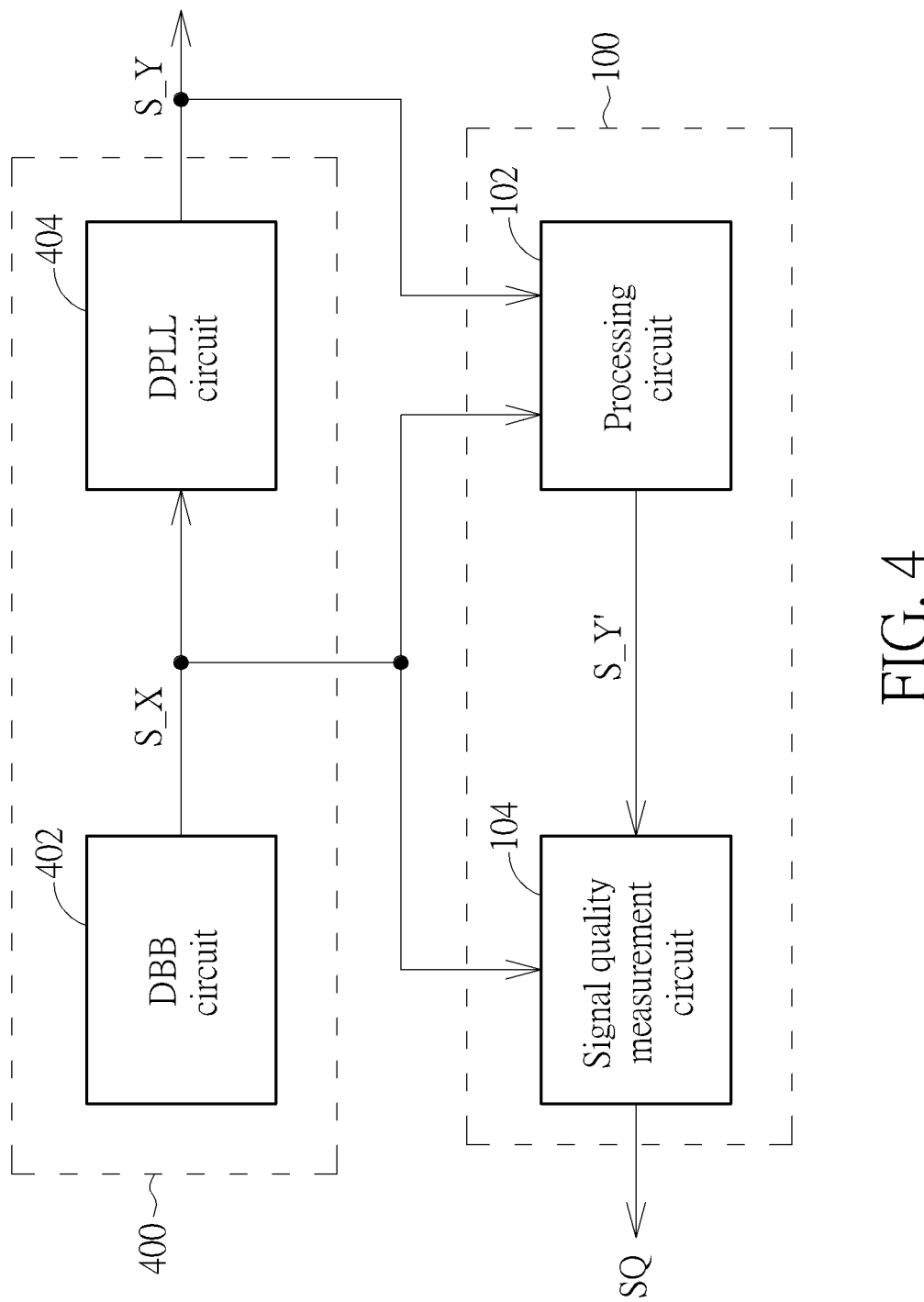
FIG. 4 is a diagram illustrating a first wireless communication device whose signal quality is measured using the proposed signal quality measurement apparatus shown in FIG. 1.

FIG. 4 is a diagram illustrating a first wireless communication device whose signal quality is measured using the proposed signal quality measurement apparatus 100 shown in FIG. 1. In this embodiment, the first circuit 10 shown in FIG. 1 may be a digital baseband (DBB) circuit 402 of a wireless communication device 400, and the second circuit 12 shown in FIG. 1 may be a digital phase-locked loop (DPLL) circuit 404 of the wireless communication device 400. For example, the DPLL circuit 404 may be an all-digital phase-locked loop (ADPLL) circuit, and the DBB circuit 402 may include a baseband modem module. When the DPLL circuit 404 is an ADPLL circuit, the phase samples and frequency deviation (FD) samples output from the DBB circuit 402 to the DPLL circuit 404 may act as inputs for polar-modulation.

In a case where the wireless communication device 400 is a BT device, the reference signal S_X may be a GFSK modulated signal that is an output of a modulator included in the modem module of the DBB circuit 402. For example, the samples $x_n$ {$x_n$, n=0, 1, . . . , N−1} included in the reference signal S_X may be waveform samples (I & Q samples), and the samples $y_m$ {$y_m$, m=0, 1, . . . , M−1} included in the signal under test S_Y may be waveform samples (I & Q samples). For another example, the samples $x_n$ {$x_n$, n=0, 1, . . . , N−1} included in the reference signal S_X may be FD samples, and the samples $y_m$ {$y_m$, m=0, 1, . . . , M−1} included in the signal under test S_Y may be FD samples. For yet another example, the samples $x_n$ {$x_n$, n=0, 1, . . . , N−1} included in the reference signal S_X may be phase samples, and the samples $y_m$ {$y_m$, m=0, 1, . . . , M−1} included in the signal under test S_Y may be phase samples.

In another case where the wireless communication device 400 is a ZigBee device, the reference signal S_X may be an offset-quadrature phase shift keying (O-QPSK) modulated signal that is an output of a modulator included in the modem module of the DBB circuit 402. For example, the samples $x_n$ {$x_n$, n=0, 1, . . . , N−1} included in the reference signal S_X may be waveform samples (I & Q samples), and the samples $y_m$ {$y_m$, m=0, 1, . . . , M−1} included in the signal under test S_Y may be waveform samples (I & Q samples). For another example, the samples $x_n$ {$x_n$, n=0, 1, . . . , N−1} included in the reference signal S_X may be FD samples, and the samples $y_m$ {$y_m$, m=0, 1, . . . , M−1} included in the signal under test S_Y may be FD samples. For yet another example, the samples $x_n$ {$x_n$, n=0, 1, . . . , N−1} included in the reference signal S_X may be phase samples, and the samples $y_m$ {$y_m$, m=0, 1, . . . , M−1} included in the signal under test S_Y may be phase samples.

The signal quality measurement apparatus 100 provides a tool to verify the modulation accuracy at the output of the DPLL circuit 404, evaluate the performance after each RF design revision at the output of the DPLL circuit 404, debug the RF design at the output of the DPLL circuit 404, evaluate the trade-off after each RF design revision at the output of the DPLL circuit 404, or evaluate the modulation accuracy without expensive test instrument. Furthermore, the wireless communication device 400 may compare a previous signal quality value and a current signal quality value provided by the signal quality measurement apparatus 100, to determine whether to calibrate the DPLL circuit 404 and how to calibrate the DPLL circuit 404.

Figure 5:
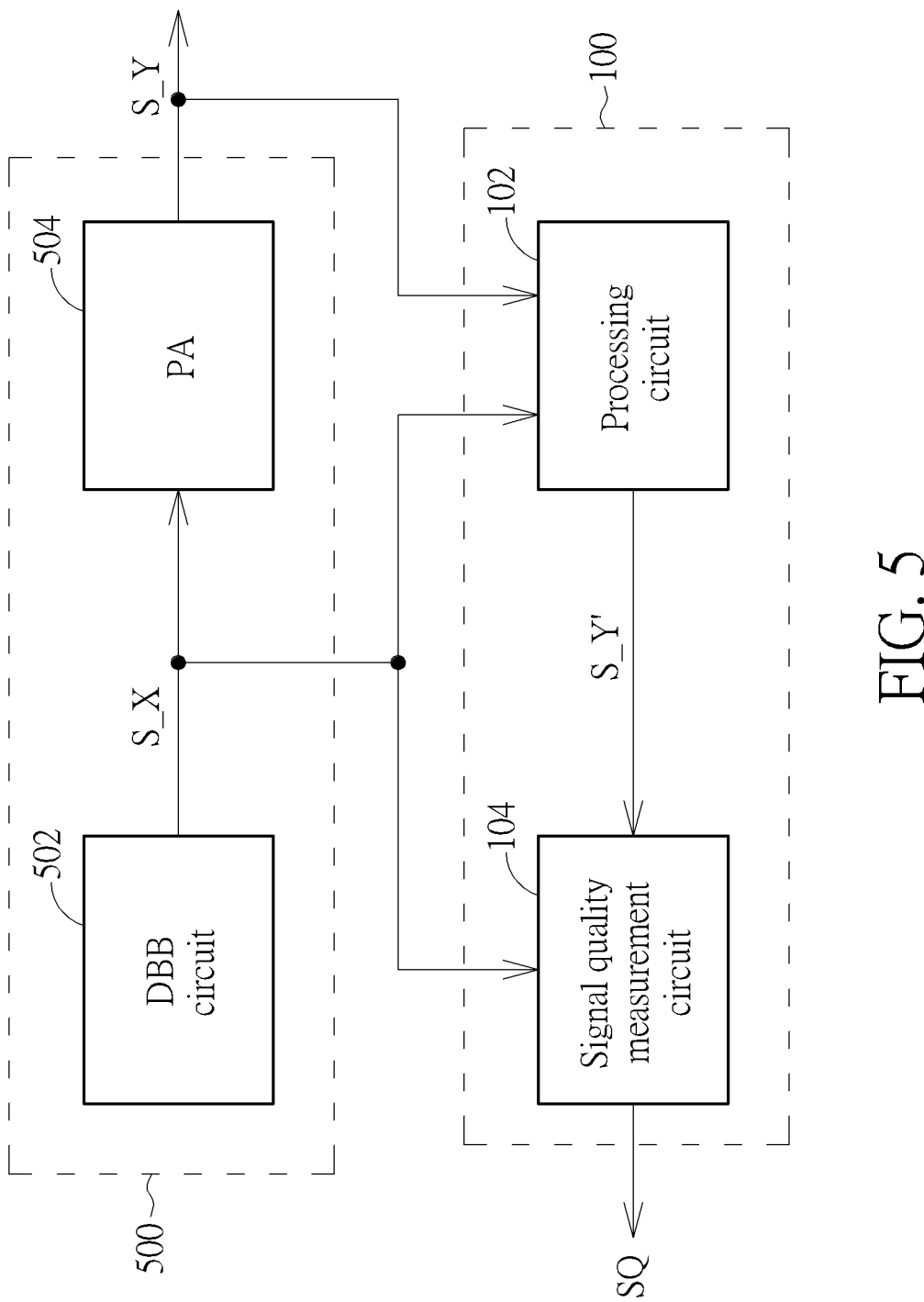
FIG. 5 is a diagram illustrating a second wireless communication device whose signal quality is measured using the proposed signal quality measurement apparatus shown in FIG. 1.

FIG. 5 is a diagram illustrating a second wireless communication device whose signal quality is measured using the proposed signal quality measurement apparatus 100 shown in FIG. 1. In this embodiment, the first circuit 10 shown in FIG. 1 may be a DBB circuit 502 of a wireless communication device 500, and the second circuit 12 shown in FIG. 1 may be an analog RF circuit (e.g., a power amplifier (PA) 504) of the wireless communication device 500. The reference signal S_X may be a GFSK modulated signal or an O-QPSK modulated signal. For example, the samples $x_n$ {$x_n$, n=0, 1, . . . , N−1} included in the reference signal S_X may be waveform samples (I & Q samples), and the samples $y_m$ {$y_m$/m=0, 1, . . . , M−1} included in the signal under test S_Y may be waveform samples (I & Q samples). For another example, the samples $x_n$ {$x_n$, n=0, 1, . . . , N−1} included in the reference signal S_X may be magnitude samples $$\left(\text{i.e., } x_n = \sqrt{I_n^2 + Q_n^2}\right),$$

and the samples $y_m$ {$y_m$, m=0, 1, . . . , M−1} included in the signal under test S_Y may be magnitude samples. For yet another example, the samples $x_n$ {$x_n$, n=0, 1, . . . , N−1} included in the reference signal S_X may be power samples (i.e., $x_n = I_n^2 + Q_n^2$), and the samples $y_m$ {$y_m$, m=0, 1, . . . , M−1} included in the signal under test S_Y may be power samples. The wireless communication device 500 may perform optimization of the PA 504 according to one or more signal quality values SQ provided by the signal quality measurement apparatus 100.

It should be noted that the above applications are for illustrative purposes only, and are not meant to be limitations of the present invention. In some embodiments, the signal quality measurement apparatus 100 may monitor the signal quality for transmit/receive (TX/RX) loop-back adjustment. In some embodiments, the signal quality measurement apparatus 100 may monitor a current received packet or a current used channel to report a signal quality value to an upper layer for TX/RX optimization. For example, if a signal quality value indicative of poor signal quality is generated, re-calibration of the RF circuit may be triggered at the wireless communication device 400/500. For another example, if a signal quality value indicative of poor signal quality is generated, the upper layer is informed of the interfered channel and will prevent the wireless communication device 400/500 from using this interfered channel next time. To put it simply, the present invention has no limitations on applications in which the proposed signal quality measurement design is used.

In one exemplary implementation, the signal quality measurement apparatus 100 may be used to provide on-line signal quality measurement and calibration of the wireless communication device 400/500. For example, the wireless communication device 400/500 and the signal quality measurement apparatus 100 may be integrated in a same chip. In another exemplary implementation, the signal quality measurement apparatus 100 may be used to provide off-line signal quality measurement and debugging of the wireless communication device 400/500. For example, the signal quality measurement apparatus 100 may be realized by a processor which loads and executes program codes to achieve functions of the processing circuit 102 and the signal quality measurement circuit 104. That is, the processing circuit 102 may be realized by the processor that runs one software module, and the signal quality measurement circuit 104 may be realized by the processor that runs another software module. Hence, the designer of the wireless communication device 400/500 can obtain the off-line signal quality measurement result without using any test instrument, and can refer to the off-line signal quality measurement result to optimize the circuit design of the wireless communication device 400/500.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A signal quality measurement apparatus comprising:
a processing circuit, arranged to receive a reference signal from a first circuit and a signal under test from a second circuit, and refer to the reference signal to derive a signal after processing from the signal under test, wherein the signal under test is derived from predetermined signal processing of the reference signal; and
a signal quality measurement circuit, arranged to calculate a signal quality value according to the reference signal and the signal after processing;
wherein the reference signal comprises a plurality of first samples at a first sampling rate, the signal under test comprises a plurality of second samples at a second sampling rate that is different from the first sampling rate, and the processing circuit comprises:
a sampling rate conversion circuit, arranged to perform a sampling rate conversion operation upon the signal under test to generate a re-sampled signal under test, wherein the re-sampled signal under test comprises a plurality of third samples at the first sampling rate; and
a follow-up processing circuit, arranged to derive the signal after processing from the re-sampled signal under test according to the reference signal.

2. The signal quality measurement apparatus of claim 1, wherein the second sampling rate is higher than the first sampling rate, and the sampling rate conversion operation comprises down-sampling; or the second sampling rate is lower than the first sampling rate, and the sampling rate conversion operation comprises up-sampling.

3. The signal quality measurement apparatus of claim 1, wherein the follow-up processing circuit comprises:
a cross-correlation circuit, arranged to perform cross-correlation between the re-sampled signal under test and the reference signal, to find an optimal starting sample position of the re-sampled signal under test; and
a selection circuit, arranged to extract consecutive samples from the plurality of third samples of the re-sampled signal under test and output the consecutive samples as the signal after processing, wherein the consecutive samples start from a third sample of the re-sampled signal under the test that corresponds to the optimal starting sample position.

4. The signal quality measurement apparatus of claim 1, wherein the reference signal is a baseband modulation signal.

5. The signal quality measurement apparatus of claim 4, wherein the baseband modulation signal is a constant envelope (CE) modulation signal.

6. The signal quality measurement apparatus of claim 5, wherein the CE modulation signal is a Gaussian Frequency Shift Keying (GFSK) signal or a ZigBee signal.

7. The signal quality measurement apparatus of claim 1, wherein the reference signal and the signal under test both comprise waveform samples, or frequency deviation (FD) samples, or phase samples.

8. The signal quality measurement apparatus of claim 1, wherein the signal under test is an output of a digital phase-locked loop (DPLL) circuit or an output of a power amplifier (PA).

9. A signal quality measurement apparatus comprising:
a processing circuit, arranged to receive a reference signal from a first circuit and a signal under test from a second circuit, and refer to the reference signal to derive a signal after processing from the signal under test, wherein the signal under test is derived from predetermined signal processing of the reference signal; and
a signal quality measurement circuit, arranged to calculate a signal quality value according to the reference signal and the signal after processing;
wherein the reference signal comprises a plurality of first samples at a sampling rate, the signal after processing comprises a plurality of second samples at the sampling rate, and the signal quality computation circuit comprises:
a matching gain estimation circuit, arranged to find an optimal matching gain for the signal after processing according to the plurality of first samples and the plurality of second samples;
an adjustment circuit, arranged to apply the optimal matching gain to the plurality of second samples included in the signal after processing, to generate a plurality of gain-adjusted samples, respectively; and
a calculation circuit, arranged to calculate the signal quality value according to the plurality of first samples and the plurality of gain-adjusted samples.

10. A signal quality measurement method comprising:
receiving a reference signal from a first circuit and a signal under test from a second circuit, wherein the signal under test is derived from predetermined signal processing of the reference signal;
referring to the reference signal to derive a signal after processing from the signal under test; and
calculating a signal quality value according to the reference signal and the signal after processing;
wherein the reference signal comprises a plurality of first samples at a first sampling rate, the signal under test comprises a plurality of second samples at a second sampling rate that is different from the first sampling rate, and referring to the reference signal to derive the signal after processing from the signal under test comprises:
performing a sampling rate conversion operation upon the signal under test to generate a re-sampled signal under test, wherein the re-sampled signal under test comprises a plurality of third samples at the first sampling rate; and
deriving the signal after processing from the re-sampled signal under test according to the reference signal.

11. The signal quality measurement method of claim 10, wherein the second sampling rate is higher than the first sampling rate, and the sampling rate conversion operation comprises down-sampling; or the second sampling rate is lower than the first sampling rate, and the sampling rate conversion operation comprises up-sampling.

12. The signal quality measurement method of claim 10, wherein deriving the signal after processing from the re-sampled signal under test according to the reference signal comprises:

performing cross-correlation between the re-sampled signal under test and the reference signal, to find an optimal starting sample position of the re-sampled signal under test; and extracting consecutive samples from the plurality of third samples of the re-sampled signal under test, and outputting the consecutive samples as the signal after processing, wherein the consecutive samples start from a third sample of the re-sampled signal under test that corresponds to the optimal starting sample position.

13. The signal quality measurement method of claim 10, wherein the reference signal is a baseband modulation signal.

14. The signal quality measurement method of claim 13, wherein the baseband modulation signal is a constant envelope (CE) modulation signal.

15. The signal quality measurement method of claim 14, wherein the CE modulation signal is a Gaussian Frequency Shift Keying (GFSK) signal or a ZigBee signal.

16. The signal quality measurement method of claim 10, wherein the reference signal and the signal under test both comprise waveform samples, or frequency deviation (FD) samples, or phase samples.

17. The signal quality measurement method of claim 10, wherein the signal under test is an output of a digital phase-locked loop (DPLL) circuit or an output of a power amplifier (PA).

18. A signal quality measurement method comprising:

receiving a reference signal from a first circuit and a signal under test from a second circuit, wherein the signal under test is derived from predetermined signal processing of the reference signal;

referring to the reference signal to derive a signal after processing from the signal under test; and calculating a signal quality value according to the reference signal and the signal after processing:

wherein the reference signal comprises a plurality of first samples at a sampling rate, the signal after processing comprises a plurality of second samples at the sampling rate, and calculating the signal quality value according to the reference signal and the signal after processing comprises:

finding an optimal matching gain for the signal after processing according to the plurality of first samples and the plurality of second samples;

applying the optimal matching gain to the plurality of second samples included in the signal after processing, to generate a plurality of gain-adjusted samples, respectively; and calculating the signal quality value according to the plurality of first samples and the plurality of gain-adjusted samples.

* * * * *